May 7, 1935.   J. R. POWER   2,000,189

REGULATED RECTIFIER

Filed Jan. 10, 1934

INVENTOR
J. R. POWER
BY Wayne B Wells
ATTORNEY

Patented May 7, 1935

2,000,189

UNITED STATES PATENT OFFICE 2,000,189

REGULATED RECTIFIER

James R. Power, East Orange, N. J., assignor to Bell Telephone Laboratories, Incorporated, New York, N. Y., a corporation of New York Application January 10, 1934, Serial No. 706,010

16 Claims. (Cl. 175—363)

This invention relates to rectifier circuits and particularly to regulated rectifiers for supplying rectified current to load circuits and battery charging circuits.

One object of the invention is to provide a regulated rectifier for supplying rectified current to a load circuit and to a battery that shall be completely compensated for the current supplied to the load circuit and that shall be only partially compensated for the current supplied to the battery.

Another object of the invention is to provide a plurality of regulated rectifiers connected to the same load circuits that shall be compensated for the current supplied to the load circuits in such manner as to divide the load on the rectifiers according to a fixed ratio.

Another object of the invention is to provide a regulated rectifier having an inductive impedance network for connecting the rectifier to an alternating current supply circuit to compensate for supply circuit voltage variations that shall control the rectifier output circuit for changing the phase of the current supplied to the rectifier to improve the operation of the rectifier.

A further object of the invention is to provide a plurality of regulated rectifiers each connected to an alternating current supply circuit by an inductive impedance network to compensate for supply circuit voltage variations that shall have each rectifier partially compensated for current supplied to a battery and completely compensated for current supplied to a load circuit in a manner to divide the load on the rectifiers according to a fixed ratio and that shall control each rectifier output circuit for changing the phase of the current supplied to the rectifier to improve the operation of the rectifier.

The regulated rectifier circuit disclosed in this application is an improvment on the regulated rectifier circuit disclosed in the application of H. M. Stoller, Serial No. 665,063, filed February 3, 1933. In a regulated rectifier circuit supplying current not only to a load circuit but also to a storage battery floated on the load circuit, it is desirable to protect the rectifier and also the battery against abnormal current when charging the battery. When a number of rectifiers are connected to the same load circuit, it is desirable to provide means for dividing the load on the rectifiers according to a fixed ratio. Furthermore, a regulated rectifier provided with inductive impedance in the input circuit to the rectifier will draw a lagging current which tends to interfere with the regulating operation.

In a regulated rectifier circuit constructed in accordance with the present invention one or a number of rectifiers may be connected to a number of load circuits. Each rectifier is compensated for supply circuit voltage variations and for variations in the load on the rectifier. Provision is made to completely compensate the regulating operation for current supplied to a load circuit and to only partially compensate the regulating operation for charging current supplied to a battery. A resonant circuit is provided in the output circuit of each rectifier for changing the phase of the current supplied to the rectifier to improve the regulating operation. When a number of rectifiers are connected to the same load circuits, equalizing means are provided to divide the load between the rectifier according to a fixed ratio.

In the present regulated rectifier circuit each rectifier is connected to an alternating current supply circuit by means of two inductive reactors. One of the inductive reactors is saturated with alternating current and comprises two alternating current windings. The other inductive reactor is saturated with direct current and effectively unsaturated with alternating current and comprises two alternating current windings and a direct current winding. The alternating current windings of the two inductive reactors form the arms of a bridge circuit, which connects the rectifier to the alternating current supply circuit. The direct current winding on the unsaturated reactor serves as a load compensating coil and is connected to the output circuit of the reactor. The bridge circuit serves to compensate the rectifier action for changes or variation in supply circuit voltage. A direct current winding on the unsaturated reactor serves to compensate the rectifier action for changes in load on the rectifier.

It is preferable to have a second direct current winding on the unsaturated reactor for giving the reactor an initial excitation. The second direct current winding on the unsaturated reactor may be connected to any suitable source of direct current power, but is preferably connected across the rectifier output circuit. The second direct current winding on such reactor performs no useful function in the regulating operation other than that of initially exciting the unsaturated reactor. The voltage across the output circuit of the rectifier is assumed to be substantially constant. Any changes in voltage across the rectifier out put circuit would control the second direct current winding in such manner as to hinder rather than to assist the regulating operation.

When the rectifier is connected to a load circuit and a battery is floated across the load circuit, it is desirable to protect the rectifier and also the battery against abnormal charging currents when the battery is being charged. Protection for the battery and the rectifier against abnormal charging currents is effected by connecting the load circuit in series with the complete compensating coil and by connecting the battery across the load circuit in series with a portion only of the compensating coil. Thus, the rectifier operation is compensated for the current supplied to the load circuit and is only partially compensated for the charging current supplied to the battery. Accordingly, the regulated rectifier provides substantially constant voltage under normal operating conditions and limits the current supplied to the battery during the battery charging operation.

The inductance of the bridge circuit which connects the rectifier to the alternating current supply circuit produces a lag in the current supplied to the rectifier which tends to interfere with the regulating operation. A shift in the phase of the current supplied to the rectifier to correct for the lag effected by the inductive bridge circuit is effected by means of a tuned circuit in the rectifier output circuit. A parallel tuned circuit which is resonant to a frequency somewhat below the ripple frequency is connected in series with the rectifier output circuit. In case the alternating current supply circuit has a frequency of sixty cycles and the rectifier is a full wave, single phase, rectifier, then the ripple in the rectifier output would be substantially one hundred and twenty cycles. In such case it has been found preferable to make the tuned circuit in the rectifier output circuit resonant to a frequency of the order of approximately one hundred cycles. The tuned circuit in the rectifier output circuit does not suppress the ripple in the rectifier output and serves chiefly to shift the phase of the current supplied to the rectifier. The ripple in the rectifier output circuit and the noise current are suppressed by means of a filter connected in the load circuit beyond the rectifier and the battery.

When a number of rectifiers are connected to the same load circuits, it is desirable to provide means for insuring that each rectifier carries its proportional share of the load. In order to insure that the current supplied to the load circuits is divided among the rectifiers according to a fixed ratio, the compensating coils associated with the various rectifiers are connected in parallel circuit relation. Thus, the current in the compensating coil of each regulated rectifier will be proportional to the total load on the load circuits rather than the load on the individual rectifier. Thus, if a rectifier tends to deliver more than its share of the load, the excess load will not be compensated for and the voltage of that regulated rectifier will be reduced. Such means will limit the excess load that any regulated rectifier can carry.

In the accompanying drawing, Fig. 1 is a diagrammatic view of a regulated rectifier constructed in accordance with the invention.

Figure 1:
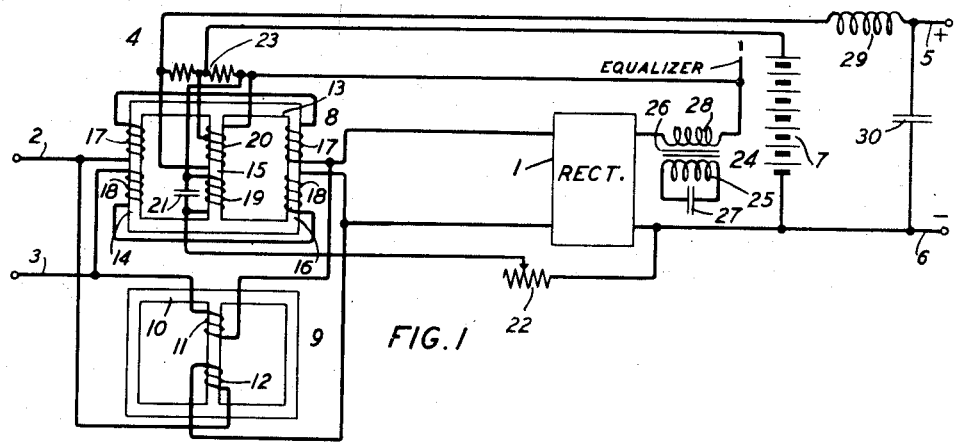

Referring to Fig. 1 of the drawing, a rectifier 1 is connected to an alternating current supply circuit comprising conductors 2 and 3 by means of a bridge circuit 4. The output circuit of the rectifier 1 is connected to a load circuit comprising conductors 5 and 6. A battery 7 is floated across the load circuit.

Figure 2:
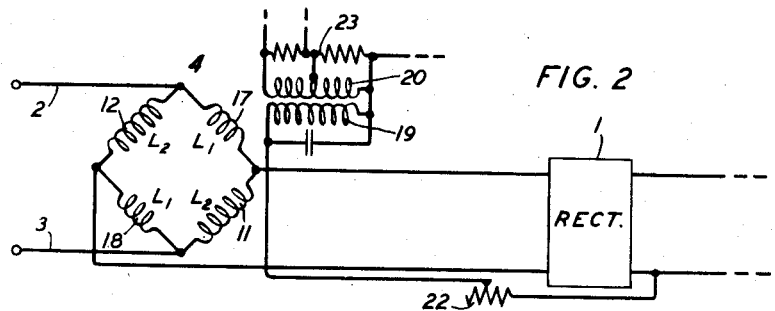
Fig. 2 is a diagrammatic view of the windings comprising the reactors shown in Fig. 1 of the drawing.

The bridge circuit 4 is formed by windings of an effectively unsaturated inductive reactor 8 and windings of a saturated reactor 9. The saturated reactor 9 comprises a core member 10 and two alternating current windings 11 and 12. The unsaturated reactor 8 comprises a core member 13 having legs 14, 15 and 16, two alternating current windings 17 and 18 which are mounted on the outside legs 14 and 16 of the core 13, and two direct current windings 19 and 20 which are mounted on the central leg 15 of the core member 13. The alternating current windings 17, 18, 11 and 12 of the inductive reactors 8 and 9 form a bridge circuit as shown in Fig. 2 of the drawing for connecting the rectifier 1 to the alternating current supply conductors 2 and 3.

The direct current winding 19 on the unsaturated reactor 8 is connected across the output circuit of the rectifier to give the unsaturated reactor an initial excitation. A condenser 21 is preferably connected across the winding 19 for taking care of any inductive discharges. The winding 19 is assumed to be supplied with a substantially constant voltage current, inasmuch as the output circuit of the rectifier 1 is assumed to have substantially constant voltage. Variations in voltage in the output circuit of the rectifier would control the direct current winding 19 to oppose rather than assist in the regulating operation. An adjustable resistance 22 is preferably provided in series with the winding 19.

The direct current winding 20 serves as a compensating winding to compensate the regulating operation according to the load carried by the rectifier. The load circuit comprising the conductors 5 and 6 is connected in series with the compensating winding 20 so that the regulated rectifier is fully compensated in accordance with the load supplied to the load conductors 5 and 6. The rectifier 1 not only supplies current to the load conductors 5 and 6, but also supplies charging current to the battery 7 which is floated on the load circuit. If the battery is discharged to any extent, it is apparent that if the regulating operation is fully compensated for the battery charging current during the charging operation, the battery will draw an excessive current which will be injurious not only to the battery, but also to the rectifier. In order to protect the rectifier and the battery against excessive charging currents, the regulated rectifier operation is only partially compensated for the charging current supplied to the battery. Such operation may be effected by connecting one terminal of the battery to a tap extending from the compensating winding 20. Preferably a potentiometer is connected across the terminals of the winding 20 and a tap extending therefrom. One terminal of the battery is connected to the potentiometer so that an adjustment of the charging current supplied to the battery may be easily effected. In Fig. 1 of the drawing a potentiometer 23 is shown connected across the terminals of the compensating winding 20 and a tap from the compensating winding 20 is connected to a tap on the potentiometer 23.

The inductive impedance of the bridge circuit 4 in the input circuit of the rectifier 1 tends to supply the rectifier with a lagging current. A tuned circuit 24 is provided in the output circuit of the rectifier 1 in order to shift the phase of the current supplied to the rectifier and improve the regulating operation. The tuned circuit 24 comprises the secondary winding 25 of a transformer 26 and a condenser 27. Transformer 26 is provided with a primary winding 28 in series with the output circuit of the rectifier. The transformer 26 is so designed that it has a very high magnetizing current. The tuned circuit 24 is resonant at frequencies somewhat below the ripple frequency in the rectifier output circuit. In case a full-wave single-phase rectifier is connected to a sixty cycle alternating current supply circuit, then the ripple frequency in the rectifier output would be chiefly one hundred and twenty cycles. If the ripple frequency in the rectifier output circuit is one hundred and twenty cycles, then the tuned circuit 24 will be made resonant at approximately one hundred cycles. The tuning of the circuit 24 at 100 cycles will not suppress the ripple frequency to any material degree, but will change the phase of the current supplied to the rectifier 1. The ripple frequency in the rectifier output circuit and also noise currents are suppressed by means of a filter comprising an inductance element 29 and a capacity element 30. The tuned circuit 24 in effect reduces the voltage drop of the regulator and improves the inherent regulation of the regulated rectifier circuit. The improvement in inherent regulation reduces the compensation required by the regulator and thus reduces the size and the power losses in the regulator windings.

Figure 3:
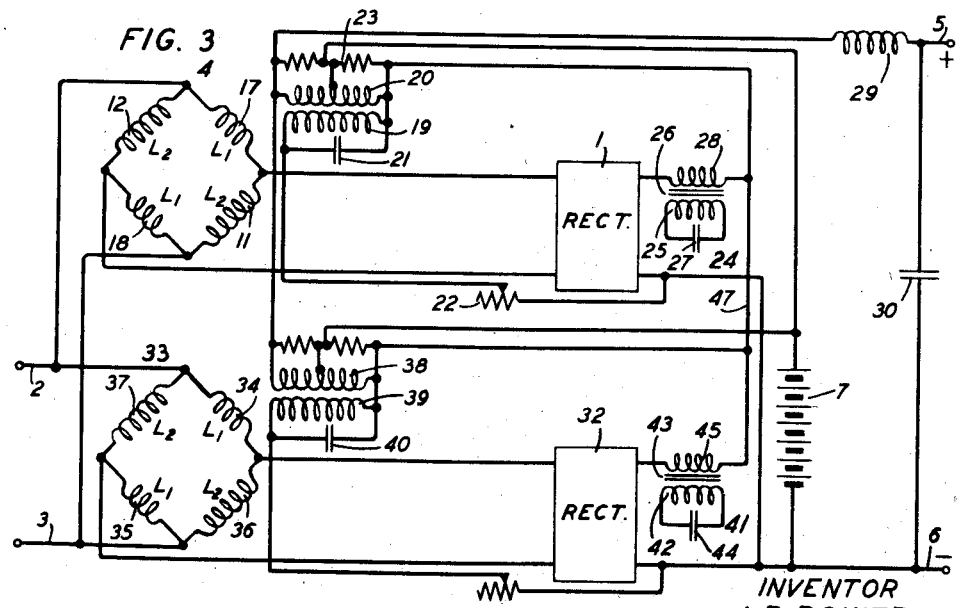
Fig. 3 is a diagrammatic view showing a number of rectifiers connected to the same load circuit and provided with load equalizer means.

Referring to Fig. 3 of the drawing, a rectifier 32 is shown associated with the rectifier 1 for supplying current to the load circuit and to the battery 7. The rectifier 32 is regulated in the same manner as the rectifier 1 and is connected to the alternating current supplying conductors 2 and 3 by means of a bridge circuit 33. The bridge circuit 33 comprises alternating current windings 34, 35 on an unsaturated inductive reactor similar to the unsaturated reactor 8 shown in Fig. 1 of the drawing and alternating current windings 36 and 37 on a saturated inductive reactor similar to the saturated inductive reactor 9 shown in Fig. 1 of the drawing. A complete drawing of the saturated and unsaturated reactors associated with the bridge circuit 33 is deemed unnecessary in view of the showing in Fig. 1 of the drawing. The unsaturated reactor is provided with two direct current windings 38 and 39 which correspond to the direct current windings 20 and 19 shown in Fig. 1 of the drawing. The direct current winding 39 is connected across the output circuit of the rectifier 32 and serves to initially excite the unsaturated reactor. The winding 39 is preferably shunted by a condenser 40 to take care of inductive discharges. The direct current winding 38 serves to compensate the bridge circuit 33 in accordance with load circuit conditions.

A tuned circuit 41 similar to the tuned circuit 24 shown in Fig. 1 of the drawing is provided in the output circuit of the rectifier 32. Tuned circuit 41 comprises a secondary winding 42 of a transformer 43 and a capacity element 44. The transformer 43 is provided with a primary winding 45 in the output circuit of the rectifier 32.

When two or more rectifiers are connected to the same load circuits, it is desirable to equalize the load on the rectifiers and to prevent any rectifier taking more than its share of the load. In order to equalize the load on the various rectifiers, each compensating winding is connected to an equalizing bus conductor 47 which serves to connect the compensating windings 20 and 38 in parallel circuit relation. By so connecting the compensating windings 20 and 38 in parallel circuit relation, it is apparent that the current in each compensating winding will be proportional to the total load circuit rather than the load on the various individual rectifiers. If a rectifier tends to deliver more than its share of the load, the excess load will not be compensated for and the voltage of that rectifier will be reduced. This will limit the excess load that the rectifier will carry. The rectifiers 1 and 32 shown in Fig. 3 of the drawing may be of any suitable type.

Modifications in the regulated rectifier may be made within the spirit and scope of the invention and such modifications are intended to be covered by the appended claims.

What is claimed is:

1. In a regulated rectifier, a rectifier for supplying rectified current to two load circuits, an impedance network for connecting said rectifier to an alternating current supply circuit to compensate for supply circuit voltage variations, and means for controlling said network to completely compensate the rectifier action for the load current supplied by the rectifier to one of said load circuits and to only partially compensate the rectifier action for the load current supplied by the rectifier to the other load circuit.

2. In a regulated rectifier, a rectifier for supplying rectified current to a load circuit, an impedance network for connecting said rectifier to an alternating current supply circuit to compensate for supply circuit voltage variations, a storage battery connected across said load circuit, and means for completely compensating the rectifier action for current supplied by the rectifier to the load circuit and for partially compensating the rectifier action for charging current supplied by the rectifier to the battery.

3. In a regulated rectifier, a bridge circuit having two vertices thereof connected to an alternating current supply circuit, a rectifier having the input circuit thereof connected to the other two vertices of the bridge circuit, a load circuit and a storage battery connected to the rectifier output circuit, and means for varying the impedance of said bridge circuit at one rate according to the current supplied to said load circuit and at a different rate according to the current supplied to said battery.

4. In a regulated rectifier, a rectifier adapted to supply rectified current to a load circuit, a bridge circuit connecting said rectifier to an alternating current supply circuit and serving to compensate for variations in the supply circuit voltage, compensating means for varying the impedance of said bridge circuit according to the load on said load circuit to maintain the rectified voltage substantially constant, a storage battery, and means for connecting said battery across the rectifier output circuit to only partially compensate the rectifier action for the battery charging load.

5. In a regulated rectifier circuit, a rectifier supplying rectified current to a load circuit, a storage battery, a saturated reactor having two alternating current windings, an unsaturated reactor having two alternating current windings and a direct current winding, a bridge circuit formed by the alternating current windings of said reactors, said bridge connecting the rectifier to an alternating current supply circuit, means for energizing said direct current winding of the unsaturated reactor according to the load on said load circuit, and means for connecting said battery across the output circuit of said rectifier in series with a portion only of said direct current winding to compensate the rectifier operation partially for the battery charging current.

6. In a regulated rectifier, a rectifier for supplying constant-voltage rectified current to a load circuit, a saturated reactor having two alternating current windings, an unsaturated reactor comprising a core having three legs, two alternating current windings mounted on the outside legs and a direct current winding mounted on the central leg, a bridge circuit formed with the alternating current windings of said reactors, said bridge connecting the rectifier to an alternating current supply circuit to compensate for supply circuit voltage variations, a storage battery, means for energizing said direct current winding of the unsaturated reactor according to the current supplied by the rectifier to the load circuit to maintain the rectified voltage substantially constant irrespective of rectifier load variations, and means for connecting said battery across the output circuit of said rectifier in series with a portion only of said direct current winding to compensate the rectifier operation partially for the battery charging current.

7. In a regulated rectifier system, a plurality of rectifiers adapted to supply rectified current to a load circuit, a bridge circuit for connecting each of said rectifiers to an alternating current supply circuit, said bridge circuits serving to compensate for supply circuit voltage variations, and load compensating means associated with each rectifier for compensating the rectifiers according to the load and for insuring that each rectifier carries a proportional share of the load.

8. In a regulated rectifier system, a plurality of rectifiers adapted to supply rectified current to a load circuit, a bridge circuit for connecting each of said rectifiers to an alternating current supply circuit and for compensating for supply circuit voltage variations, a compensating winding in the output circuit of each rectifier for controlling the associated bridge circuit according to the load on the rectifier, and means for connecting the compensating windings in parallel circuit relation to divide the load equally between the rectifiers.

9. In a regulated rectifier system, a plurality of rectifiers adapted to supply rectified current to a load circuit, a saturated reactor and an unsaturated reactor associated with each of said rectifiers, each saturated reactor having two alternating current windings and each unsaturated reactor having two alternating current windings and one direct current winding, a bridge formed by the alternating current windings of each pair of reactors for connecting the associated rectifier to an alternating current supply circuit, the direct current winding on the unsaturated reactor being connected in the output circuit of the associated rectifier, and means for connecting the direct current windings of all unsaturated reactors in parallel to insure each rectifier carrying a proportional share of the load on the load circuit.

10. In a regulated rectifier system, a plurality of rectifiers adapted to supply rectified current to a load circuit, a bridge circuit formed from the alternating current windings of saturated and unsaturated reactors for connecting each of said rectifiers to an alternating current supply circuit, said bridge circuits serving to compensate for supply circuit voltage variations, a compensating winding in the output circuit of each rectifier for controlling the associated unsaturated reactor to compensate for the load on the rectifier, and means for connecting said compensating windings in parallel circuit relation to divide the load in a fixed ratio between the rectifiers.

11. In a regulated rectifier system, a plurality of rectifiers adapted to supply rectified current to a load circuit, an impedance network comprising a saturated inductive reactor and an unsaturated inductive reactor for connecting each of said rectifiers to an alternating current supply circuit to compensate for supply circuit voltage variations, a compensating winding in the output circuit of each rectifier for controlling the associated network according to the load, and means for connecting the compensating windings in parallel circuit relation to divide the load in a fixed ratio between the rectifiers.

12. In a regulated rectifier, a rectifier for supplying rectified current to a load circuit, an inductive impedance network for connecting said rectifier to an alternating current supply circuit and for compensating for supply circuit voltage variations, and means in the rectifier output circuit comprising a parallel tuned circuit resonant to a frequency somewhat below the rectifier ripple frequency for shifting the phase of the current supplied to the rectifier to increase the voltage output.

13. In a regulated rectifier, a rectifier supplying rectified current to a load circuit, a bridge circuit comprising inductance arms, two of said inductance arms being mounted on a saturated core and the other two inductance arms being mounted on an unsaturated core, said bridge connecting the rectifier to an alternating current supply circuit and compensating for variations in the supply circuit voltage, and means in the rectifier output circuit comprising a parallel tuned circuit resonant to a frequency somewhat below the rectifier ripple frequency for shifting the phase of the current supplied to the rectifier to neutralize the lag in the current caused by the inductance arms of said bridge circuit.

14. In a regulated rectifier, a rectifier supplying rectified current to a load circuit, a bridge circuit comprising inductance arms connected between said rectifier and an alternating current supply circuit, two arms of said bridge circuit being mounted on a saturated core and the other two arms of said bridge circuit being mounted on an unsaturated core, means controlled by the rectifier load circuit for varying the degree of saturation of the unsaturated core to maintain substantially constant voltage on the load circuit irrespective of load changes, and means in the rectifier output circuit comprising a parallel tuned circuit resonant to a frequency somewhat below the rectifier ripple frequency for shifting the phase of the current supplied to the rectifier to increase the voltage output.

15. In a regulated rectifier circuit, a plurality of rectifiers for supplying current to a load circuit and to a battery, an inductive impedance network for connecting each rectifier to an alternating current supply circuit and for compensating for supply circuit voltage variations, means for only partially compensating each rectifier for battery charging current and for completely compensating each rectifier for current supplied to the load circuit, and means to divide the load on the rectifiers according to a fixed ratio.

16. In a regulated rectifier circuit, a plurality of rectifiers for supplying current to a load circuit and to a battery, an inductive impedance network for connecting each rectifier to an alternating current supply circuit and for compensating for supply circuit voltage variations, means for only partially compensating each rectifier for battery charging current and for completely compensating each rectifier for current supplied to the load circuit, means for dividing the load on the rectifiers according to a fixed ratio, and means for controlling each rectifier output circuit to change the phase of the current supplied to the rectifier.

JAMES R. POWER.